United States Patent [19]
Davis et al.

[11] Patent Number: 4,984,255
[45] Date of Patent: Jan. 8, 1991

[54] EDGE TRANSITION INSENSITIVE DELAY LINE SYSTEM AND METHOD

[75] Inventors: Craig M. Davis, Santa Clara; Gary W. Tietz, Cupertino, both of Calif.

[73] Assignee: National Semiconductor Corporation, Santa Clara, Calif.

[21] Appl. No.: 436,897

[22] Filed: Nov. 15, 1989

[51] Int. Cl.$^5$ .............................................. H04L 7/00
[52] U.S. Cl. ..................................... 375/106; 375/113; 331/25
[58] Field of Search .............. 375/106, 113, 110, 118, 375/119, 120; 328/63, 155; 207/262; 331/47, 57, 25

[56] References Cited

U.S. PATENT DOCUMENTS

| | | | |
|---|---|---|---|
| 3,959,601 | 5/1976 | Olevsky et al. | 375/120 |
| 4,419,760 | 12/1983 | Bjorholt | 328/155 |
| 4,464,771 | 8/1984 | Sorensen | 328/63 |
| 4,520,319 | 5/1985 | Baker | 375/120 |
| 4,607,296 | 8/1986 | Smidth | 375/120 |
| 4,675,885 | 6/1987 | Gagliardi et al. | 375/110 |
| 4,795,985 | 1/1989 | Gailbreath, Jr. | 375/119 |
| 4,849,704 | 7/1989 | Thornton | 328/155 |
| 4,876,700 | 10/1989 | Girindahl | 375/120 |

Primary Examiner—Douglas W. Olms
Assistant Examiner—Stephen Chin
Attorney, Agent, or Firm—Limbach, Limbach & Sutton

[57] ABSTRACT

A system (100, 50, 300) for recovering a clock signal from a serial data signal (102) having rising (204) and falling (206) transitions. The transistions (204, 206) are detected by a transition detector (11, 12, 108, 110) which generates a transition signal (13a, 13b, 109, 111) having a first logic state when a rising (204) or falling (206) transition is detected. The system (100, 50, 300) includes a delay device (22, 120, 122) which delays the transition signal (13a, 13b, 109, 111) by a preselected time period and a gating device (24, 124, 126) responsive to the transition signal (13a, 13b, 109, 111). The gating device (24, 124, 126) is enabled by the transition signal (13a, 13b, 109, 111) when the signal is the first logic state, thereby permitting a system generated clock signal (148) to propagate to a phase comparison system (132, 134, 176, 178, G1, G4) for comparison with the delayed transition signal (23, 128, 130). The phase comparison system (132, 134, 178, G1, G4) generate a correction signal (30) indicative of the phase difference between the compared signals (23, 25, 144, 152, 130, 154) such that the transitions in clock signal (148) generated are in synchronization with the data transitions (204, 206).

24 Claims, 6 Drawing Sheets

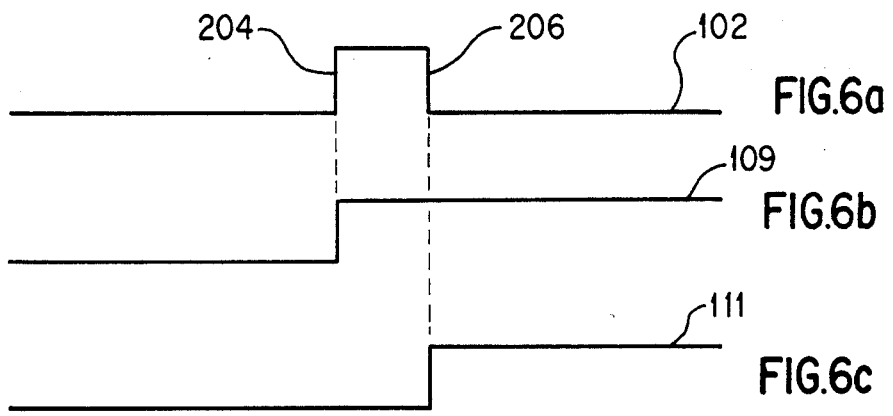

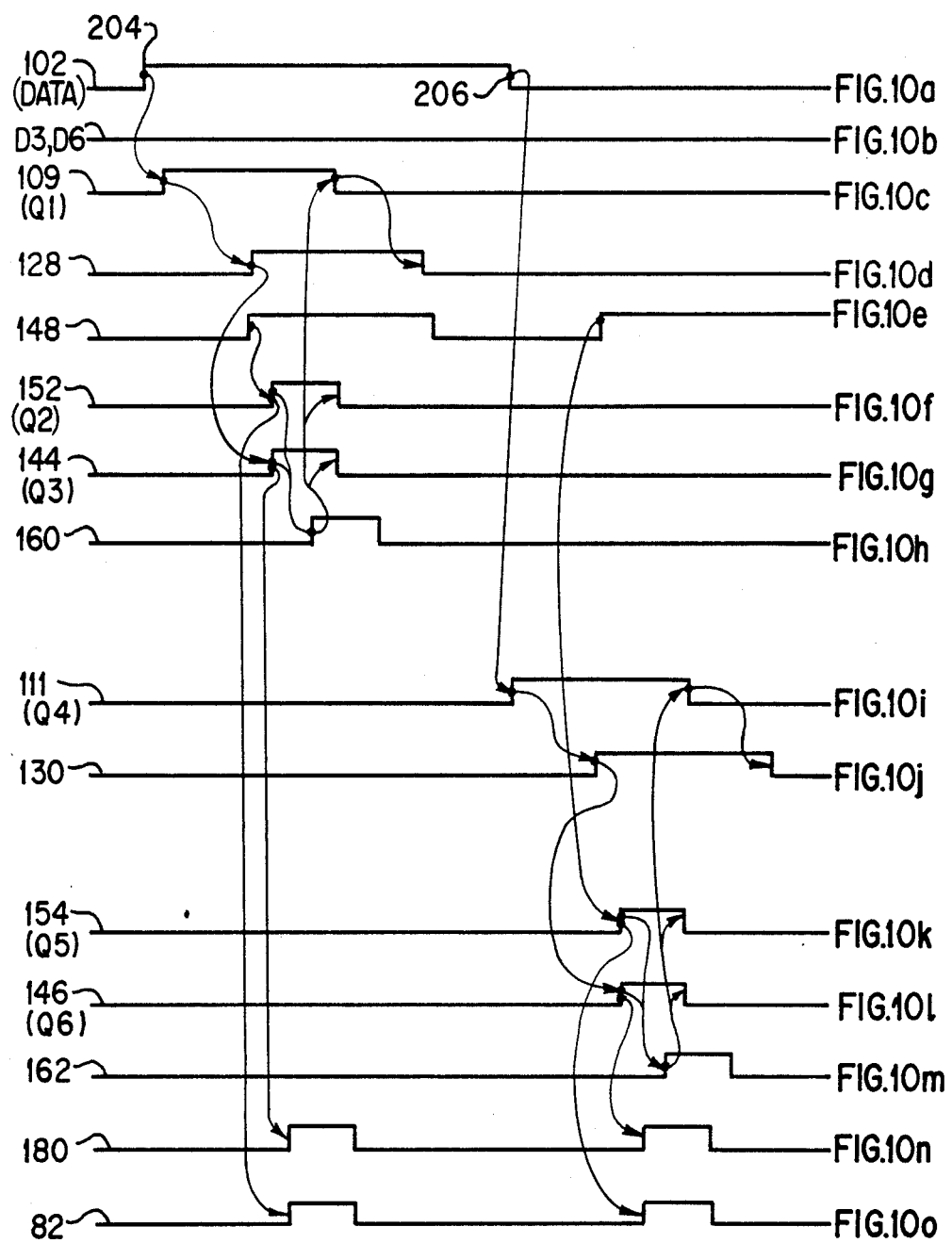

EDGE TRANSITION INSENSITIVE DELAY LINE SYSTEM AND METHOD

TECHNICAL FIELD

The present invention broadly relates to delay lines and more particularly to delay lines employed in a serial data communication system to center data in a clock recovery resynchronization scheme.

BACKGROUND OF THE INVENTION

Typical serial data communications systems, such as LAN and disk drive systems, use a single channel to send and receive data and clock information between two users. Embedding data and clock information into a single channel is typically done to minimize wiring or improve recording media data densities. A variety of different schemes, such as run length limited and manchester encoding, are used to embed the clock information into the data signal. These schemes strive to transfer data as efficiently as possible while minimizing the likelihood of improperly recovering the data. (Bit error rate: BER). Part of the task of recovering data at the receiving end of such a data link is to re-establish a local receive clock which frames (or denotes data bit) boundaries. Many of these schemes utilize both the rising and the falling (i.e. positive and negative) transitions of the channel information to denote data states and/or clock (also referred to as a data cell) boundaries.

Referring to FIG. 1, a data cell 200 in one of the above mentioned schemes is defined as the minimal allotted time during which a data signal 102 is allowed to transition or change state. During the data recovery process, the data signal 102 is sampled to determine the presence or the absence of a rising (positive) data transition 204 or a falling (negative) data transition 206. Under ideal conditions, the transitions 204, 206 occur in the center of the data cell 200. If a transition 204, 206 occurs within the data cell 200, the occurrence of the transition, either positive or negative, is represented as a logic high or "1"; if no transition has occurred, this situation is represented as a logic low or "0". For example, for the data signal 102 illustrated, the data signal 102 may be represented as "1101011" over the period of seven data cells 200. The type of data/clock encoding algorithm employed determines how these data cells are grouped to translate (encode/decode) between words of strictly data and data with embedded clocks. The particular encoding scheme employed may depend upon the required needs or characteristics of the media (i.e., magnetic media flux density dependent bit shift) or the constraints of the recovery system (i.e., desire for no DC averaged component in the information transmitted.). The chosen grouping of data patterns will be tailored to ease the task of correctly regenerating the local receive clock (i.e., minimize the probability that it frames the data at the wrong data rate). A harmonic lock condition is an example of where the data transition spacings deceive the local clock into running at a stable but incorrect frequency.

In the FDDI system, a 4B/5B RLL encoding scheme is employed. The required data rate is 100 Mbits/sec. Due to the 4 bit to 5 bit encoding, the frequency of the local receive clock is 125 MHz. Since 1/125 MHz=8 ns., each of the data cells 200 is 8 ns. wide. Hence, every 8 ns. the data signal 102 is sampled to determine whether the data signal 102 has changed states (i.e., transitioned). Ideally the data transitions 204, 206 would occur 4 ns. into the data cell 200. (I.e., in the center of the data cell 200). This centering allows for margin in the placement of any given transition during actual transmission due to degradations in the components in the data path (drivers, transmission media, sync noise).

Referring to FIG. 2, as previously discussed, typically a separate clock signal is not sent in conjunction with the data because it is expensive to dedicate a separate channel for the clock signal. Rather, the clock information is embedded into the data signal. The clock information is extracted from the data signal by running a local oscillator (or receive clock) at a multiple of the data signal's transition rate.

The local receive clock must, by nature, be capable of varying its frequency to align itself in phase and frequency to the incoming channel information. This frequency shift and phase alignment capability is typically accomplished using a phase lock loops (PLL). A conventional PLL system 10 employs a voltage controlled oscillator (VCO) 20 as the local clock source. The VCO's frequency is stabilized by comparing its rising phase transitions with the phase transitions of a reference signal 12. The reference signal 12 is input to a phase comparator 16 along with the VCO transition signal 28 which compares the phase of the two incoming signals 12, 28 and generates a correction signal 30 indicative of the difference between them. The correction signal 30 is active for and proportional to the time difference between the two signals 12, 28 and instructs the VCO 20 how much to speed up or slow down in order to properly track the interval rate of the reference signal 12. If the reference signal 12 arrives at the phase comparator 16 first, it has a higher frequency than the VCO transition signal 28 and the correction signal 30 instructs the VCO 20 to increase its voltage which, in turn, increases its frequency.

If the VCO 20 has a higher frequency (faster) than the frequency of the reference signal 12, then the VCO transition signal 28 arrives at the phase comparator 16 first and the correction signal 28 instructs the VCO 20 to decrease its frequency. The correction signal 30 is input to a low pass RC filter (LPF) 18. Hence, if the VCO 20 has a higher frequency than the reference signal 12, the correction signal 30 generated discharges the filter capacitor; conversely, if the VCO 20 has a lower frequency (slower) than the reference signal 12, then the capacitor is charged up increasing the voltage of the VCO 20 thereby increasing the frequency of the VCO transition signal 28.

If the phase of the incoming signals 12, 28 are aligned, then the phase comparator 16 does not output a correction signal 30; if the phase of the two signals 12, 28 are not aligned, then the phase comparator 16 does output a correction signal 30. As the phases of the two input signals 12, 28 become closer together, the correction pulse 30 gets narrower. The two signals 12, 28 need not have the same duty cycle. In most PLL phase comparator circuits, the correction signal 30 is the summation of a pump up and a pump down current pulse generator. It is a common practice in these systems, that in order to deal effectively with the case of close phase alignment to ensure that the pump up and the pump down components always have some finite minimum pulse width which is not zero (to avoid introducing deadband effects.) If the phase comparator circuit does not output a correction signal this implies that the summation of the pump up and the pump down components equals about zero (although they each may have some minimum complimentary magnitude pulse width).

While the conventional PLL system 10 is able to generate a system clock signal from the reference signal 12 it receives, there are several disadvantages associated with using the conventional PLL system 10 as a clock recovery system.

In a conventional PLL system the reference signal transitions that are tracked occur at a continuous rate, where in a serial data system the data transitions, which serve as the reference signal being tracked, occur at irregular but precisely spaced intervals due to the data content. Consequently, in a serial data system it is necessary to recognize when a data transition is not going to occur at the next anticipated interval and to gate off the VCO transition signal from being presented to the phase comparator 16.

In the conventional PLL system, the phase comparator 16 makes a phase comparison regardless of whether a phase transition 204, 206 has occurred in the data signal 12. In a serial data application, a serial data signal 12 is used as the referenced signal. In a serial data clock recovery system a phase comparison need only be made if a data transition has occurred. If the data signal 12 does not have a transition 204, 206 during a particular clock cycle, then it is assumed that the VCO 20 is operating at the proper frequency.

Failure to gate off the VCO transition signal 28 from being detected when no data transition is anticipated causes the PLL 10 to think that the data is merely late (or conversely, that the VCO frequency is incorrectly running too fast.) As such, the PLL 10 will attempt to correct the VCO's frequency when a correction comparison is not appropriate (since no transition occurred for a comparison to be made).

In order to gate off the VCO transition signal 28, in anticipation of a data transition not occurring, the data information presented to the reference input of the phase comparator 16 may be delayed. Another modification necessary to adapt the conventional PLL for serial data application is to make both rising and falling phase comparisons of the reference (data) signal.

Referring to FIG. 2b, a conventional clock recovery system 400 is illustrated, wherein elements similar to those in other figures are given the same name/reference numerals. The conventional system 400 incorporates the above mentioned modifications to a conventional PLL 10 by including a VCO gating and data transition detection element 312, and a delay line 22. The system's 400 performance can be degraded if the delay line 22 is not capable of passing the data pulses if the pulses become too narrow. In addition, the system's performance can be degraded if the delay of rising 204 or falling 206 transitions through the delay line 22 are not matched. As the conventional system 400 tracks the average position of the transitions, errors in the matching of rising and falling transition delays reduce the amount available that a given data transition can be displaced, from a nominal amount (window margin), before it is not detected as occurring within that window.

This invention addresses these issues and provides a clock recovery system for use in data transmission network: the Fiber Distributed Data Interface (FDDI), a large protocol concentrator design (back plane data distribution). The Fiber Distributed Data Interface (FDDI) protocol is an American National Standards Institute (ANSI) data transmission standard which applies to a 100 megabit/second token ring network that utilizes an optical fiber transmission medium. The FDDI protocol is described in "FDDI-An Overview," *Digests of Papers IEEE Computer Society Int'l Conf., Compcon '87*, Jan, 1987, which is herein incorporated by reference. The FDDI protocol was intended as a high performance interconnection among mainframe computers as well as among mainframes and their associated mass storage sub-systems and other peripheral equipment.

SUMMARY OF THE INVENTION

The present invention is directed to a system for recovering a clock signal from a data signal having both rising and falling data transitions. The transitions are detected by a detection device which is sensitive to rising and falling data transitions. The detection device generates a transition signal having a first logic state when a transition is detected in the data signal. The transition signal is delayed by a delay element for a preselected time period before being input to a comparator.

The systems also includes a clock signal generator and a comparator. The clock signal generator generates a clock signal in response to a correction signal generated by the comparator. If a transition has been detected, then the clock signal is permitted to propagate through to the comparator and the comparator compares the delayed transition signal to the clock signal. The correction signal generated indicates the phase difference, if any, between the compared signals.

The propagation of the clock signal to the comparator is controlled by a gating element responsive to the first logic state of the transition signal. If the transition signal has a first logic state, indicating that a transition has been detected, then the clock signal is permitted to propagate to the comparator; if no transition is detected, then the gating element prevents the clock signal from being supplied to the comparator and no comparison is made.

The clock signal generator generates a clock signal having transitions which occur in synchronization with the data transitions and result in the rising and falling data transitions occurring in the center of the data cell. The clock transitions and data transitions occur in synchronization when the correction signal is about zero.

The detection device may be comprised of a positive edge detector device and a negative edge detector device and the transition signal may be comprised of a positive transition signal, indicative that a positive edge was detected in the data signal, and a negative transition signal, indicative that a negative edge was detected in the data signal.

The gating device may have a rising edge gating element responsive to the rising transition signal for supplying the clock signal to the comparator when a rising edge is detected. Similarly, the gating device may have a falling edge gating element responsive to the negative transition signal for supplying the clock signal to the comparator when a falling edge is detected. A separate comparator may be dedicated to comparing the delayed rising edge signal with the clock signal and a separate comparator may be dedicated to comparing the delayed falling edge signal with the clock signal.

Thus, the present invention provides a system which accommodates for dissymmetry in propagation time for a rising transition and for a falling transition such that the regenerated clock signal is centered in the data cell window thereby minimizing window loss.

The present invention also provides a system which controls the propagation of a clock signal to a comparator wherein the clock signal is compared with the data signal if a data transition is detected in the data signal.

Another object of the invention is to provide separate but equivalent data paths for data signals indicative of rising transitions and data signals indicative of falling transitions such that the system includes separate elements for transition detecting, signal delaying, clock signal gating, and signal comparing.

A further object of the present invention is to provide an edge detector system which is insensitive to narrow data pulses or the location of data pulses in the data cell window.

These, and further objects and advantages of the present invention will be made clear or will become apparent during the course of the following description of the preferred embodiment of the present invention.

BRIEF DESCRIPTION OF THE DRAWINGS

In the accompanying drawings:

FIG. 6a is a diagram of a data signal having a rising and a falling transition;

FIG. 6b is a diagram of a data signal generated by a positive edge detector;

FIG. 6c is a diagram of a data signal generated by a negative edge detector;

FIG. 10 is a timing diagram corresponding to the clock recovery system of FIG. 9.

DETAILED DESCRIPTION OF THE PREFERRED EMBODIMENT

Figure 3:
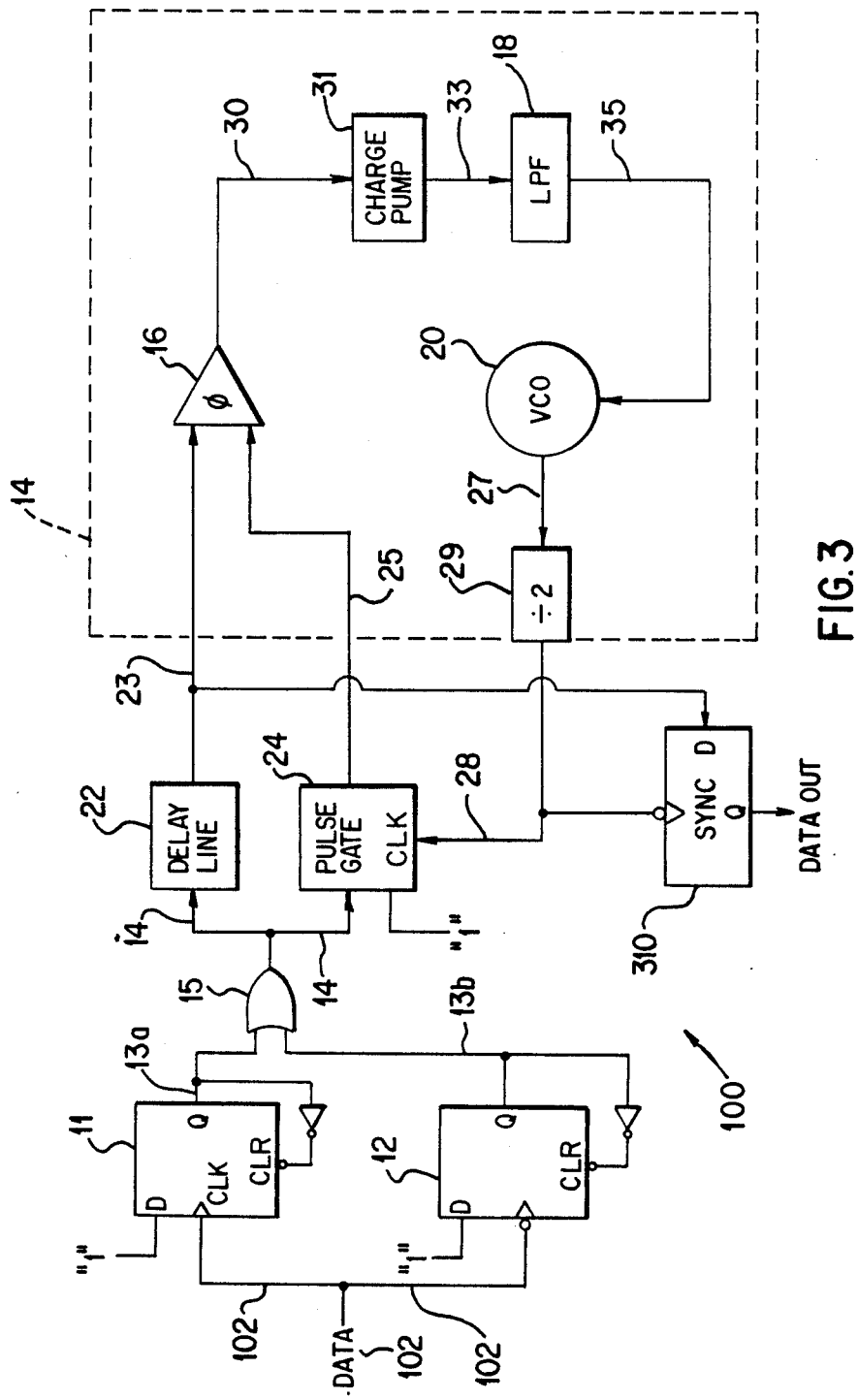
FIG. 3 is a block diagram of a clock recovery system of the present invention having a delay line and a pulse gate which detects rising and falling data transitions.

Referring to FIG. 3, a block diagram of a clock recovery system 100 is illustrated wherein similar elements are referred to with the same name and/or reference numerals. A data signal 102 is input to the clock signal input port (CLK) of a positive edge detector logic element 11 and a negative edge detector logic element 12. The logic elements 11, 12 may be D-flip flops. In the FDDI application, the incoming data signal 102 is a non-return to zero-inverted (NRZI) data signal which may originate at a remote station (for example 60 miles away) and be coupled to the clock recovery system 100 via fiber.

Referring also to FIG. 6, a constant signal D is also input to the logic elements 11, 12 and, in the preferred embodiment, the constant signal D is a logic high or "1". If a rising (or positive) data transition 204 occurs in the data signal 102, during a particular data cell 200, the positive edge detector 11 generates a positive edge detector output signal 13a which is a logic high or a "1". With a D-flip flop, when the signal into the clock input port transitions, the D-flip flop outputs a signal having the same logic state as the signal received at the flip flop's D input port. If a falling (or negative) data transition 206 occurs in the data signal 102, the negative edge detector 12 generate a negative edge detector output signal 13b. If no data transition 204, 206 is present in the signal 102 during a particular data cell, the flip flops outputs remain a 0 or a logic low signal. Hence, if a transition 204, 206 occurs, the corresponding edge detector output signals 13a, 13b is a logic high signal; if no transition occurs, it is a logic low signal.

The edge detector output signals 13a, 13b are input to an OR gate 15 and the resulting combined detector output signal 14 is input to a delay line 22 and also to a pulse gate 24. The delay line 22 delays the combined detector output signal 14 it receives by a preselected amount which, in the preferred embodiment, is the time period of one half of the synchronization clock period (the delay is also equivalent to a VCO clock cycle) and generates a delayed data signal 23.)

The primary reason for delaying the combined detector output signal 14, via the delay line 22, before it is input to a phase comparator 16 is to ensure that a sufficient amount of time is available for the pulse gate 24 to gate in the VCO transition signal 25 to the phase comparator 16, even if the data transition 204, 206 occur early or late in the data cell 200. Hence, inclusion of a delay line provides the VCO gating mechanism with sufficient time to capture or detect the presence of a data transition, even if the data transition occurs late in the designated data cell window.

The amount of delay which is appropriate, when a gated VCO configuration is employed, is about one half of the data cell width. One half a data cell delay ensures that any data transition that is expected within a particular cell is captured regardless of whether it arrives one half a data cell early or one half a data cell late. It is important that the delay line not provide greater than about one half the data cell width so that the data transition is not compared with VCO transitions associated with the adjoining data cells 200.

Figure 1:
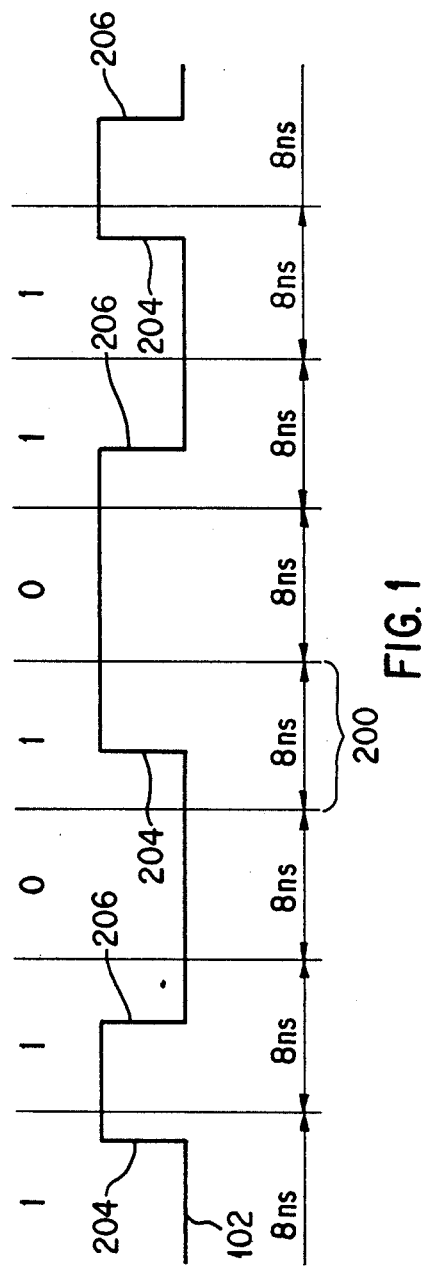
FIG. 1 is a diagram of a typical data signal and a typical data cell.
Figure 5:
FIG. 5 is a block diagram of a voltage controlled oscillator employed in the present invention.
Figure 4:
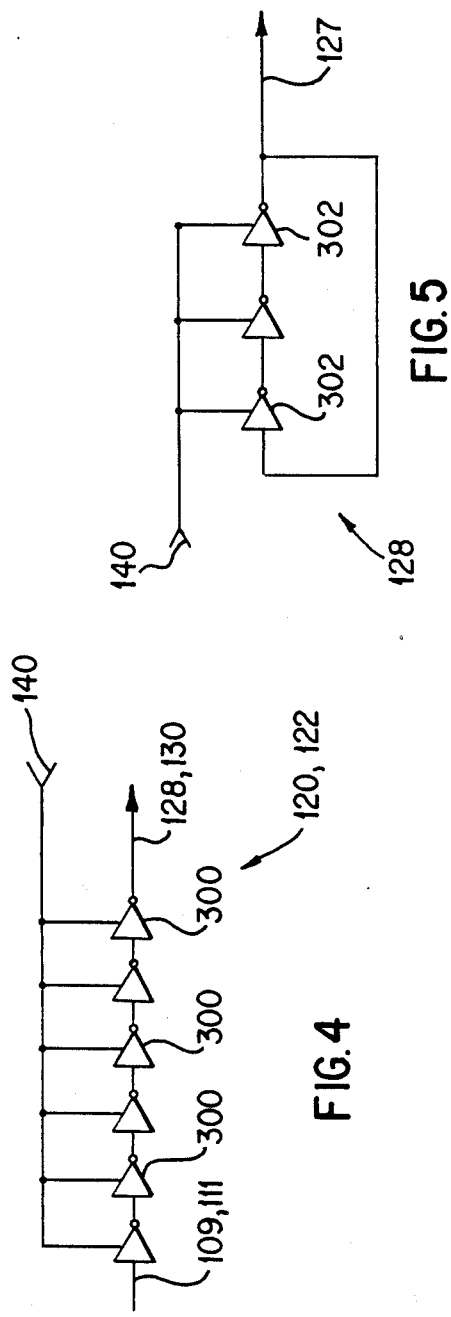
FIG. 4 is a block diagram of a delay line employed in the present invention.
Figure 2A:
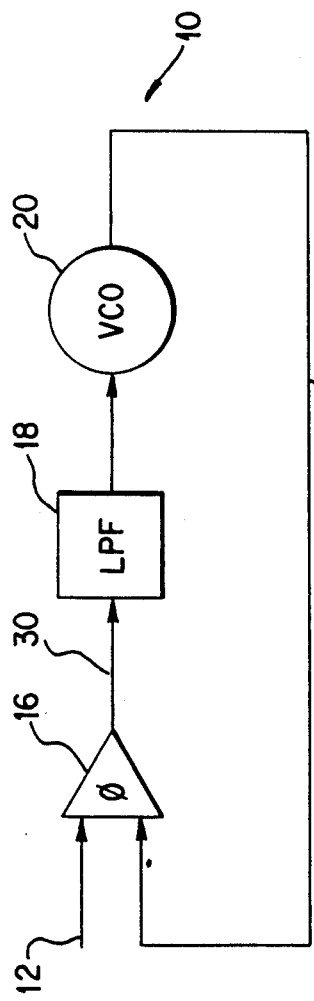
FIG. 2a is a block diagram of a conventional PLL system.
Figure 2B:
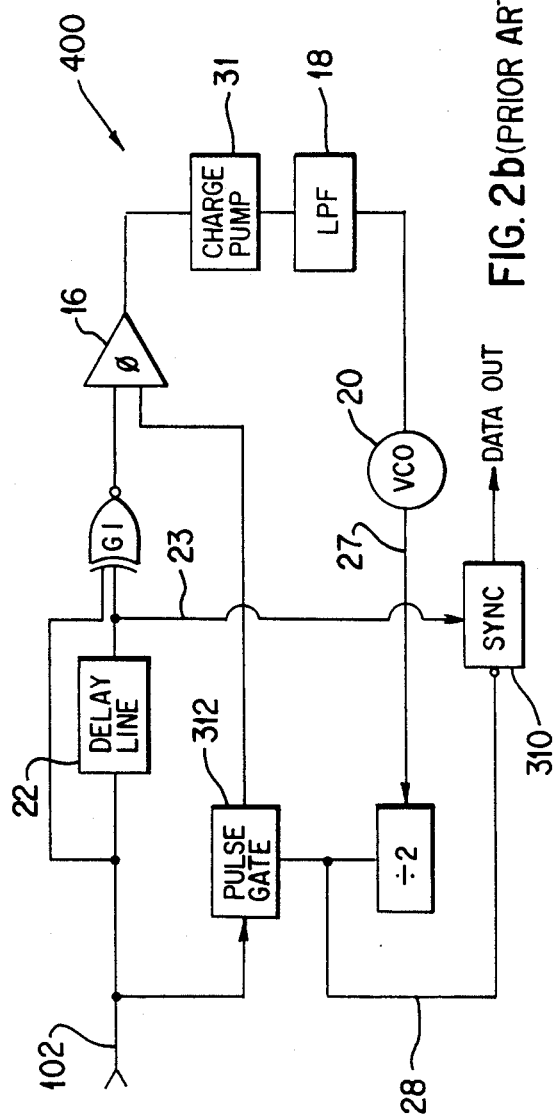
FIG. 2b is a block diagram of a conventional clock recovery system.

Referring to FIGS. 4 and 5, the delay line 22 may be comprised of a plurality of logic gates 300. The amount of time that it takes for the edge detector output signal 13 to propagate through the logic elements 300 is the time period of the delay. The preferred VCO 20 is comprised of a plurality of inverting logic gates 302, similar to the delay line gates 300, which feed back on themselves as a ring oscillator.

The VCO clock cycle is desired to be equal to the time it takes for a signal to propagate through the logic gates 302. For example, if the ring oscillator 20 is comprised of three inverting logic gates 302, then the VCO clock cycle is equal to the time it would take for the signal to propagate through six gates 302. A VCO clock cycle is complete when a signal has propagated once through the ring to produce a logic 1 state and then propagates through the ring a second time to produce a logic 0 state. Hence, the delay line 22 and the VCO 20 are comprised of elements with equivalent propagation times such that the delay line 22 delay is about equal to the time period of the VCO's 20 clock cycle. The propagation time of the gates 300, 302 is controlled by the DC voltage applied to trace 140.

Since the positive edge detector logic element 11 produces a logic one pulse upon receiving a rising data transition 204 and the negative edge detector logic element 12 produces a logic one pulse upon receiving a falling data transition 206, either incoming data transition 204, 206 produces a positive pulse. The positive pulse produced propagates down to the delay line 22 to be compared with a VCO transition signal 25.

The clock recovery system 100 performs well except when the rising and the falling transitions 204, 206 occur close together. When the rising and falling transitions occur too close together, the OR gate 15 does not see the second signal and results in the second occurring transition being lost due to pulse overlap.

Assuming the propagation time for both rising edge 204 and falling edge 206 signals to be the same, the delayed data signal 23 is input to a phase locked loop 14 having the phase comparator 16, the VCO 20, and a low pass filter 18. The phase locked loop 14 regenerates a continuous clock signal 27 (or VCO transition signal) by comparing the phase transitions of the delayed data signal 23 with the phase transitions of the gated clock signal 25 generated by the VCO 20. When the PLL 14 is locked, the delayed data signal 23 arrives at the phase comparator 16 at approximately the same time that the gated VCO transition signal 25 arrives.

The clock signal 27 is divided by a divider 29 to generate the VCO transition signal 28. (In the preferred embodiment, the clock signal 27 is divided by a divide by two divider in order to remove any duty cycle dissymetries in the clock signal 27 generated by the VCO 20.) The pulse gate 24 gates off (or blocks) the divided VCO transition signal 28 from propagating to the phase comparator 16 if no data transitions 204, 206 are present in the data cell 200.

The VCO transition signal 28 is input to the clock signal port of the pulse gate 24 and is used as the clock signal. The positive edge detector output signal 13a is ORed by OR gate 15 with the negative edge detector output signal 13b and the combined detector output signal 14 latches a "1" into the pulse gate 24 if either a positive or negative data transition 204, 206 is present in the data signal 102. The combined detector output signal 14 is a positive pulse if a transition 204, 206 is present; otherwise it is a logic low.

The VCO transition signal 28 is blocked from the phase comparator 16 by the pulse gate 24 if no data transition 204, 206 is present in the data signal 102. For this condition, the pulse gate output signal 25 remains a logic zero when the rising edge of the VCO transition signal 28 occurs. The pulse gate output signal 25 is a logic low because the combined detector output signal 14 is a logic low, if no transition 204, 206 is present in the data signal 102, effectively blocking off the VCO transition signal 28 from propagating to the phase comparator 16.

As previously discussed, in serial data applications, the reference signal received by the system 100 is a data signal 102, and often it is not known when the rising 204 or falling 206 data transitions are going to occur in a particular data cell 200. However, it is known that the data transitions 204, 206, if they are to occur, occur at intervals defined to be the data cell spacing. The data signal 102 may be sampled during the data cell 200 to determine if the data changed states during the data cell time period. By delaying the combined detector output signal 14 before comparing it with the gated VCO transition signal 25, and by using the pulse gate 24 to control the passage of the VCO transition signal 28 to the phase comparator 16, the system 100 has enough time to detect the presence of data transitions 204, 206 before a phase comparison is made.

The combined detector output signal 14 is input to the pulse gate 24 at about the same time that the signal 14 is input to the delay line 22. The propagation time through the pulse gate 24 is not critical because the feedback loop tracks it out.

In theory, the data transitions 204, 206 occur in the center of the data cell window 200, which, as previously discussed, is 8 ns wide. However, the transitions 204, 206 of the delayed data signal 23 may not occur in the center of the data cell window 200 due to a number of mechanisms associated with the transmitter, fiber interface, optical receiver or clock recovery delay line. Under ideal conditions the data transitions 204, 206 and the VCO transitions 28 are assumed to consistently arrive simultaneously at the phase comparator 16 inputs. If this condition is stable, then it equates to the data arriving "centered" in the window of the resynchronizer 310. The resynchronizer 310 samples the delayed data signal 23 arriving at the phase comparator 16 using the D flip-flop 310 clocked off of the inverse phase edge of the VCO transition signal 28 that is being used for phase comparisons. Using the inverse VCO phase edge 28 positions the delayed data transitions half way between the clocking edges which results in the maximum setup and hold time (by centering the data in the data cell window).

The divided VCO signal 28 can be used as a reference point, for purposes of window centering, as it is the clock source for the synchronizer flip-flop 310 and its phase transitions do not move instantaneously from one phase comparison to the next due to the loop filter 18.

If a data transition 204, 206 occurs between 4 ns. and 8 ns. into the data cell 200, it is considered late. If for example the data was 4 ns. late, (and therefore, at the edge of the data cell) the edge detector output signals 13a, 13b would be ORed together and the combined detector output signal 14 would be received by the pulse gate 24 with marginally enough time for (1) the pulse gate 24 to detect whether a data transition 204, 206 is present in the signal 14; and (2) whether the VCO transition signal 28 is permitted to propagate to the phase comparator 16.

The data transitions 204, 206 may also occur almost 4 ns. early in the cell window 200.

Together, the delay line 22 and the pulse gate 24 accommodate for the early and late arrival of data transitions within the data cell 200. If data signal's 102 transitions 204, 206 occur up to 4 ns. late (i.e., after the center of the cell window) as referenced from the transitions in the VCO transition signal 28, the pulse gate 24 is set by signal 14 to enable a VCO transition 28 just before the VCO signal 28 arrives at the pulse gate 24 input.

If the data transitions arrive early in the data window, as referenced from the transitions in the VCO transition signal 28, then the pulse gate 24 is set to enable a VCO transition 28 in advance thus permitting the VCO transition signal 28 to propagate through, as the gated transition signal 25. The early edge detector output signal 13a, 13b is delayed by the delay line 22 prior to being input to the phase comparator 16. The delay introduced to the combined edge detector output signal 14 is such that the delayed data signal 23 arrives at the phase comparator 16 ahead of the gated transition signal 25.

Ideally, if consecutive data transition occurs in the center of the data cell, then the data pulses appear wide (8 ns.). If consecutive data transitions are not centered in the data cell 200, (i.e., one late followed by one early), then a narrow data pulse results. The clock recovery system 100 may become unstable when it was presented with a data pattern that had one transition several nanoseconds late followed by a data transition which is several nanoseconds early. As previously discussed, data pulse narrowing may cause the system 100 to fail due to pulse overlapping at OR gate 15.

Figure 7:
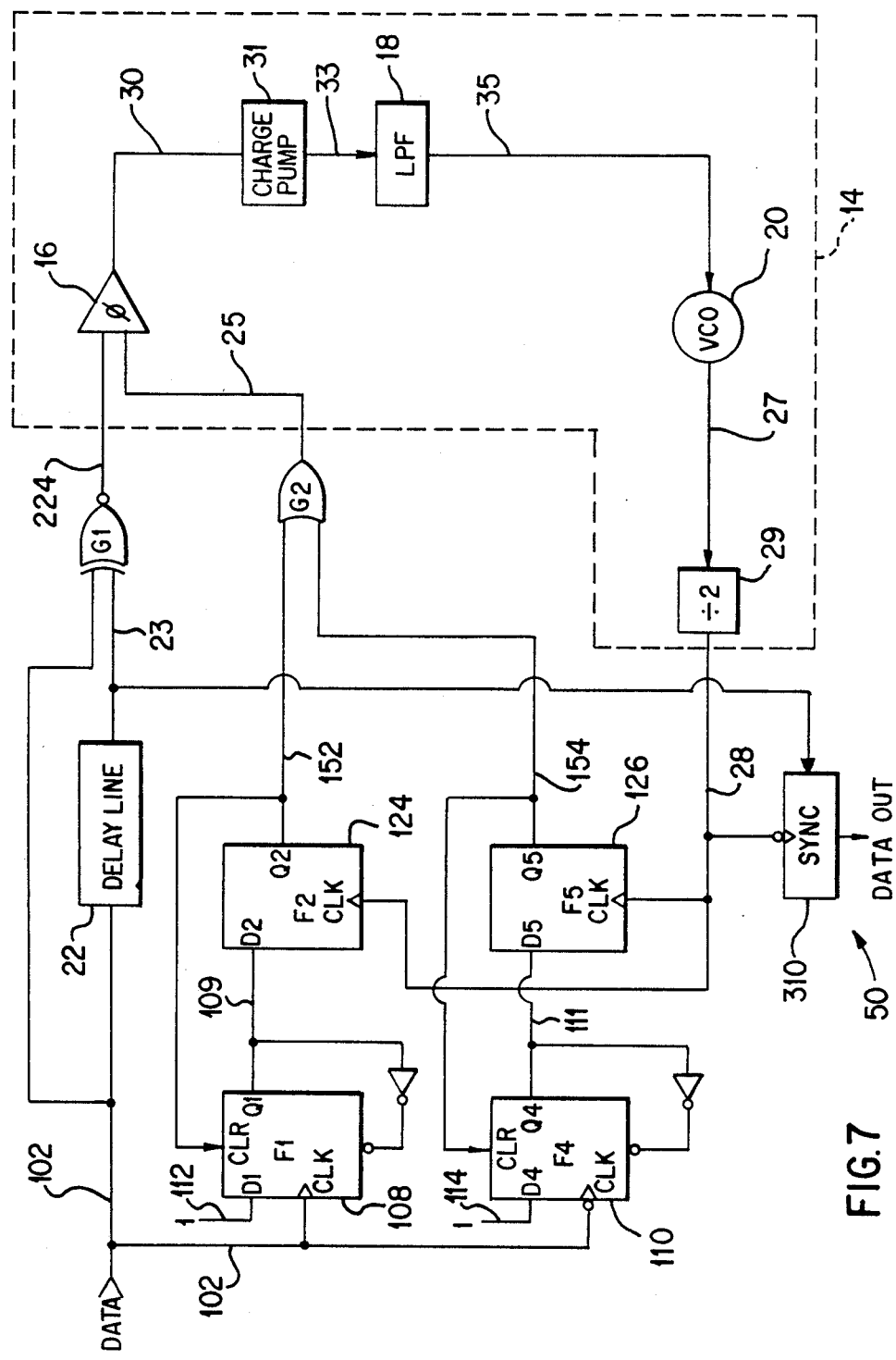
FIG. 7 is a block diagram of another clock recovery system of the present invention.

Referring to FIG. 7, another clock recovery system 50, which accommodates for the narrow pulses and pulse overlap, is illustrated. The system 50 is similar in operation to the system 100 of FIG. 6 except that the data signal 102 propagates directly to the delay line 22. An exclusive NOR gate (XNOR) G1 receives the data signal 102 and delayed data signal 23 and produces a rising transition signal 224 if any transition in the signal is present, after the time specified by the delay line 22. The problem of pulse overlapping, caused by two transitions 204, 206 occurring close together, is eliminated but requires the delay line 22 to be capable of receiving a data signal 102 having narrow data pulses.

Similar to the system 100 of FIG. 3, the data signal 102 is input to the clock signal input port (CLK) of a positive edge detector logic element (F1) 108 which may be a D-flip flop. A constant logic high signal is input to the data port D1 of the positive edge detector 108. If a rising edge 204 data transition is received, then the positive edge detector 108 generates a positive edge detector output signal (Q1) 109 which is also a logic high signal since a D-flip flop outputs a signal 109 having the same logic level as the signal input to its data port D1.

The positive edge detector output signal 109 is input to the data port D2 of a positive pulse gate logic element 124 (F2). The positive pulse gate 124 may also be a D-flip flop which receives at its clock input port CLK the VCO transition signal 28. On the rising edge of the VCO transition signal 28, the positive pulse gate 124 generates a positive gated transition signal 152 (Q2) having the same logic level as the positive edge detector output signal 109 since, on the rising edge of a clock signal, a D-flip flop outputs a signal having the same logic state as the data signal it receives. The positive gated transition signal 152 is input to the positive edge detector (more commonly called a D-flip flop) 108 which clears it when the signal 152 is a logic high.

The data signal 102 with a falling transition is input to the clock signal input port (CLK) of a negative edge detector logic element 110 (F4). The negative edge detector 110 may also be a D-flip flop and also receives a constant logic high signal at its data input port D4. The negative edge detector 110 also generates a logic high negative edge detector output signal 111 (Q4) when a negative edge 206 of the data signal 102 is received.

The negative edge output signal 111 is input to the data port D5 of a negative pulse gate 126 (Q5), which also is a D-flip flop. The VCO transition signal 28 is also input to the clock port of the negative pulse gate 126 such that, on the rising edge of the VCO transition signal 28, the negative pulse gate 126 generate a negative gated transition signal 154 having the same logic level as the negative edge detector output signal 111 which is input to the negative pulse gate's data input port D5. The negative gated transition signal 154 (Q5) is input to the negative edge detector 110 which clears it when the negative gated transition signal 154 is a logic high.

Referring also to FIGS. 6a–6c, a data signal 102 having a rising 204 and a falling 206 transition is illustrated in FIG. 6a. The rising edge 204 is input to the positive edge detector 108 which outputs a logic high positive edge detector output signal 109 when the data signal D1 is a logic high signal, as illustrated in FIG. 6b. The positive edge detector 108 generates a wide signal 109 which stays high until the positive gated transition signal 152 clears the positive edge detector 108.

The negative edge 206 of the data signal 102 is received by the negative edge detector 110 which is sensitive to falling data transitions. The negative edge detector 110 outputs a logic high negative edge detector output signal 111. The negative edge detector output signal 111 remains high until it is cleared by the negative gated transition signal 154. Hence, the negative edge detector 110 and the positive edge detector 108 generate signals 111, 109 having wide pulses.

Referring again to FIG. 7 as previously discussed, the data signal 102 is also input to the delay line 22 which delays the data signal 102 by a preselected amount. The delayed data signal 23 and the non-delayed data signal 102 are input to the logic element G1 which converts the delayed data signal 23 into data pulses. The logic element G1, in the preferred embodiment, is an exclusive NOR gate G1. When the two exclusive NOR gate inputs 23, 102 are not the same, then the exclusive NOR gate outputs a 0. The data signal 102, which has both negative 206 and positive 204 data transitions, is converted into a pulsed data signal 224 which is input to the phase comparator 16.

The positive and negative transition signals 152, 154 are input to another logic element, which is an OR gate (G2) in the preferred embodiment which generates a gated transition signal 25. The OR gate G2 generate a logic high gated transition signal 25 if either a rising 204 or a falling 206 data transition occurred in the data signal 102. The phase comparator 16 generates the correction signal 30 indicative of the phase discrepancy between the pulsed data signal 224 and the gated transition signal 25.

The phase comparator 16 receives the gated transition signal 25 and the delayed pulsed data signal 224 within the same clock period and compares the phase of the two signals 224, 25. When the VCO 20 has achieved lock, the two signals 224, 25 into the phase comparator 16 are phased aligned. If there is a difference in the phase of the two signals, the phase comparator 16 generates a correction signal 30 having a width that is proportional to the phase error between the delay line output signal 23 and the gated transition signal 25.

The correction signal 30 is input to a charge pump 31 circuit which converts the voltage correction signal 30 into an current correction signal 33. The current correction signal 33 is filtered by the low pass filter 18 before being input to the VCO 20. Depending upon the correction signal 30 generated, the correction signal 30 either charges up or discharges the charge stored in the low-pass filter's capacitor 18. The filtered signal 35 is input to the VCO 20 and either increases or decreases its frequency so that the VCO 20 produces a continuous clock signal 27 whose rising phase transitions occur in phase with the delayed pulsed data signal 224.

It may take a different amount of time for a falling edge transition 206 to propagate through the delay line 22 than it takes for a rising edge transition 204 to propagate through the delay line 22. The dissymetry between the propagation times for rising and falling data transitions causes the VCO correction signal 30 to vary, due to the delay dissymetry rather than from a phase discrepancy in the data signal. In addition, a conventional delay line 22 is typically designed to receive data signals having a certain width and has difficulty passing a signal having a narrower width. In particular, the delay line cannot pass a data signal narrower than the propagation time of one of its single internal gates. For example, if it takes about 1 ns. for a signal to propagate through one of the delay line gates, then the minimum width of the data signal it can pass is about 1 ns.

Figure 9:
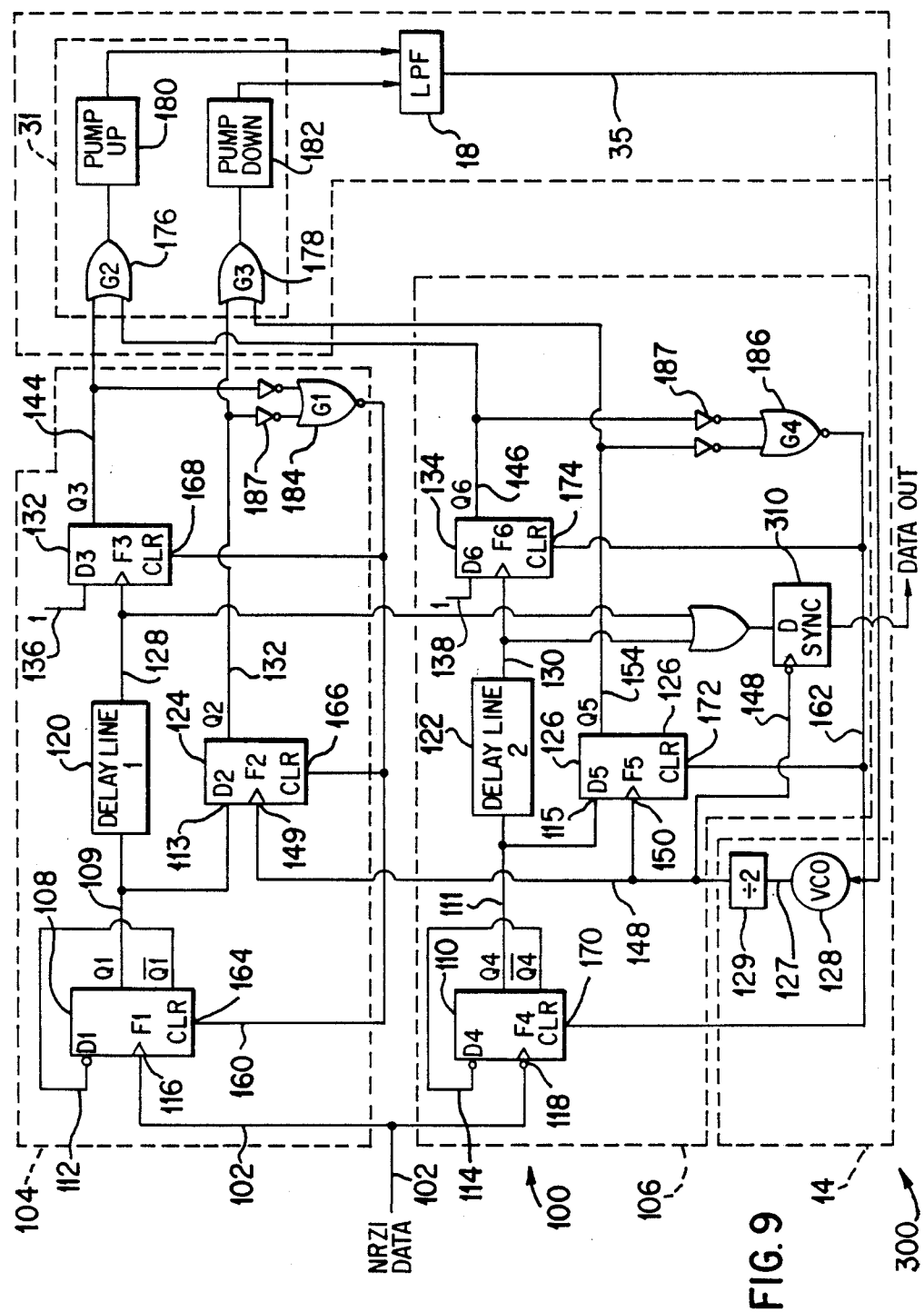
FIG. 9 is a block diagram of yet another clock recovery system of the present invention.

Referring to FIGS. 9 and 10, an edge transition insensitive delay line clock recovery system 300 which accommodated for the different propagation delays associated with positive and negative edge transitions is illustrated in FIG. 9 and a corresponding timing diagram is illustrated in FIG. 10. The system 300 receives the data signal 102, in NRZI format, and provides separate but identical data paths 104, 106 for the signals with positive data transitions 204 and for the signals with the negative data transitions 206. The positive data edge circuitry 104 is dedicated to the positive data transitions 204 and the negative data edge circuitry 106 is dedicated to negative data transitions 206.

Separate circuitry is dedicated to the positive edge transition 204 and negative edge transitions 206 in order to eliminate the introduction of different propagation times associated with negative edge data and positive edge data. By having a first delay line 120 dedicated to positive edge data 204 and a second delay line 122 dedicated to negative edge data 206, the propagation time dissymetries are accounted for since both delay lines 120, 122 are presented with positive going edge transitions.

The separate circuitry 104, 106 also reduces unnecessary truncation of the data cell time window because the rising and falling transitions are captured and released independently (i.e., by separate circuitry 104, 106). It is possible to push a pair of rising and falling data transition towards one another until flip flops 108 and 110 function incorrectly due to minimum pulse width constraints. (Pairs of transitions are said to "push toward one another" if one data transition occurs late and the next data transition occurs early.) Edge triggered flip-flops require the data to remain stable for a certain period of time before the clock edge occurs. Otherwise the flip-flop may function incorrectly.

The positive data edge circuitry 104 is comprised of a positive edge detector logic element (F1) 108 which is sensitive to rising edge data transitions 204 in the data signal 102 it receives at its clock pulse input port 116. In the preferred embodiment the positive edge detector 108 is a D-flip flop with a Q1 output signal 109 and a output signal 112. Because the positive edge detector 108 is cleared prior to the arrival of the data signal 102, a logic high or a "1" at the output is fed back into the positive edge detector's data input port (D1). On the rising edge 204 of the data signal 102, the positive edge detector 108 generates a positive edge detector output signal 109 having the same logic state as the signal 112 it receives at its data input port D1.

Thus after initialization, the positive edge detector output signal 109 will be at a logic low before the data signal 102 is received (FIG. 10c). When the positive data transition 204 is received by the positive edge detector 108 (FIG. 10a), the positive edge detector 108 outputs a positive edge detector output signal 109 (FIG. 10c) having the same level as the signal 112 it received at its data input port D1 (i.e., the output signal 109 transitions to a logic high signal (or a "1")).

The positive edge detector output signal 109 (hereinafter referred to as "positive data signal") is input to a first delay line 120 which delays the positive data signal 109 by a preselected amount and generates a delayed positive data signal 128 (FIG. 10d). In the preferred embodiment, the delay introduced is about equal to a VCO clock period, which in the preferred embodiment is 4 ns. The speed of the first delay line 120 is identical to a voltage controlled oscillator (VCO) 128 since the VCO 128 and the delay 120 have similar gate architecture and a common input lead 140 which controls their propagation delay time (FIGS. 4 and 5).

The delayed positive data signal 128 is input to the clock signal input port cf a positive edge phase logic element (F3) 132. The positive phase comparator system consists of the positive phase logic element 132, a positive pulse gate 124, and a logic gate G1. Hence, the positive phase comparator has two inputs: the delayed positive signal and a VCO transition signal 148.

The positive phase logic element 132, in the preferred embodiment, is also a D flip flop which is matched in all characteristics (i.e., layout orientation and power level to a negative edge phase comparator logic element (F6) 134). The data input port D3 of the positive phase logic element 132 receives a constant logic high or "1" data port input signal 136 (FIG. 10b) as an input and the positive phase comparator 132 generates a positive phase output signal (Q3) 144. The positive phase output signal 144 is one of the output signals generated by the positive phase comparator system.

When the delayed positive data signal 128 has a rising edge 204, (FIG. 10d) then the positive comparator output signal 144 generated (FIG. 10g), also has the same logic level as the signal 136 input to the data port D3. Hence, the positive comparator output signal 144 is also a logic high signal. If the delayed positive edge signal 128 does not have a rising edge, then this signifies that a positive data transition 204 did not occur in a particular data cell 200. Hence, the positive phase logic element 132 records the occurrence of the delayed data signal 128 arriving by generating the positive phase output signal 144.

The positive comparator output signal 144 is input to a first logic OR (G2) 176 along with a negative phase output signal 146. (The negative phase output signal 146 is one of the output signals generated by the negative phase comparator.) If either signal 144, 146 is a logic high, then the first OR gate (G2) 176 generates a logic high PUMP UP signal 180 (FIG. 10n). Thus, if a rising edge transition 204 occurs in the data signal 102, a PUMP UP signal 180 is generated.

The positive edge detection output signal 109 is also input to the data input port D2 of a positive pulse gate logic element (F2) 124, which is a D flip-flop in the preferred embodiment. A voltage controlled oscillator (VCO) 128, which is part of the system's phase locked loop 14, generates a signal 127 to track the frequency of the data signal 102. The signal 127, in the preferred embodiment, is divided by a second preselected amount by a divider 129, (a divide by two divider in the preferred embodiment). The divided signal 148 is the VCO transition signal 148 which is input to the clock signal input ports of the positive pulse gate logic element 124. The VCO transition signal 148 clocks in the data signal D2 on its rising edge and the positive pulse gate generate a positive pulse gate output signal 152 (Q2) having the same logic level as the signal 113 into its data port D2. The positive pulse gate output signal 152 is one of the positive phase comparator system output signals.

The positive pulse gate 124 controls the propagation of the VCO transition signal 148 and by doing so, it has dual functions. First, the positive pulse gate 124 records the occurrence of the VCO transition signal 148 only when the positive data edge circuitry 104 receives a rising edge data signal. The occurrence of the VCO transition signal 148 is recorded only when there is a positive data transition in the data signal 102 because, in the preferred embodiment, the positive phase comparator only compares the phase of the positive data signal 109 and the VCO transition signal 148 if in fact the positive data edge circuitry 109 did receive a rising edge transition signal. Hence, the positive pulse gate 124 in effect functions to "gate" the VCO transition signal 148.

The second function of logic element 124 is to control the commencement of the positive phase comparator system by initiating its operative by recording the occurrence of a VCO transition by generating the gated VCO transition signal 152.

The occurrence of the VCO transition signal 148 (FIG. 10e) is recorded by the positive pulse gate 124 generating a logic high signal (or "1") positive pulse gate output signal 152 (FIG. 10f) when the positive data signal 109 is a logic high (FIG. 10c). (Again, the positive data signal 109 is a logic high when a rising edge 204 data signal 102 is received (FIG. 10a). If no rising edge 204 occurs in the data signal 102 during a particular data cell, then the positive data signal 109 is a logic low and the positive pulse gate 124 outputs a logic low positive pulse gate output signal 152, in effect not acknowledging the presence the VCO transition signal 148, even though the VCO 128 continues to generate a clock signal 127 which would have been in phase with the data signal 102 had it occurred.

The positive pulse gate output signal 152 and a negative pulse gate output signal 154 are input to a second logical OR gate (G3) 178. If either input signal 152, 154 is a logic high, then the second OR gate 178 generates a logic high PUMP DOWN signal 182 (FIG. 10o). Hence, if a rising edge transition 204 occurs in the data signal 102 during a particular clock cycle, then a PUMP DOWN signal 182 is also generated.

Figure 8A:
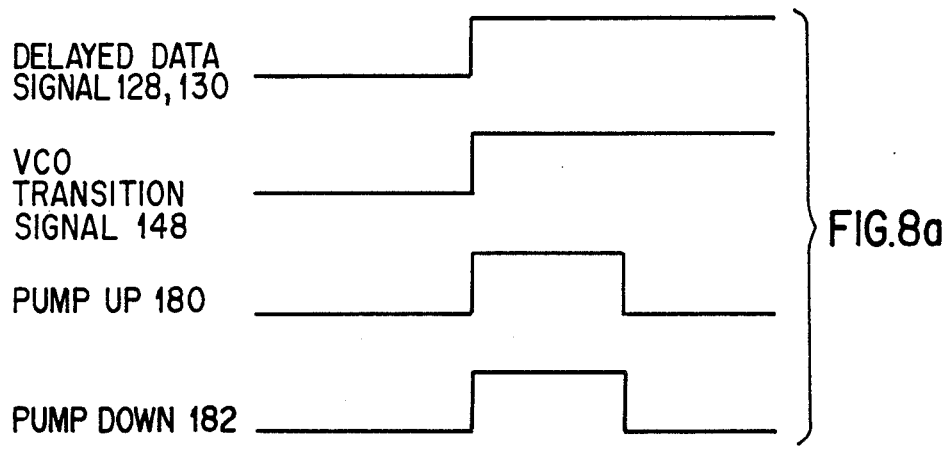
FIG. 8a is a timing diagram for a pump up signal and a pump down signal generated by the present invention when a voltage controlled oscillator (VCO) transition signal and data signal are phase aligned.
Figure 8B:
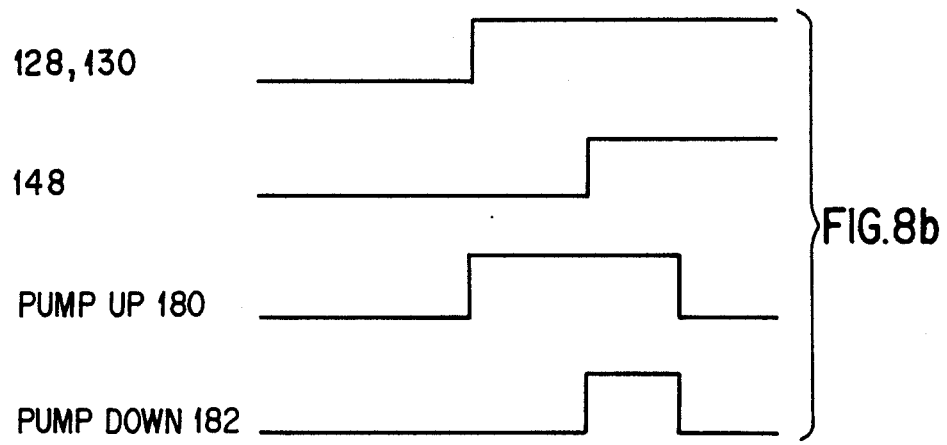
FIG. 8b is similar to FIG. 8a but corresponds to when the VCO transition signal's phase lags behind the phase of the data signal.
Figure 8C:
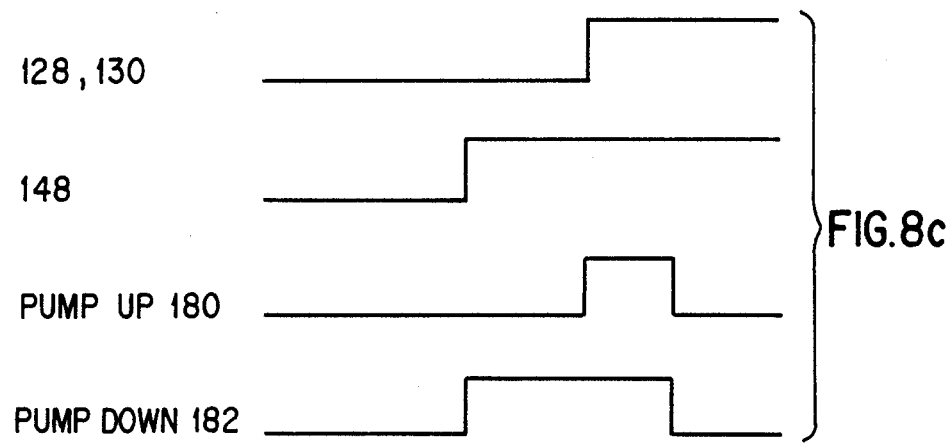
FIG. 8c is similar to FIG. 8a but corresponds to when the phase of the VCO transition signal is ahead of the data signal's phase.

The positive pulse gate output signal 152 and the positive comparator output signal 144 are input into a first reset circuitry element 184 (G1) which in the preferred embodiment is a first logical NOR gate (G1) 184. The first reset circuitry 184 produces a first reset signal 160 which is input to the positive pulse gate 124 and the positive phase comparator 132 to clear them after they have both generated logic output signals 144, 152. The clearing of the positive pulse gate (F2) 124 and the positive phase comparator (F3) 132 terminates the phase comparison sequence by the positive phase comparator system and determines the charge pump signals 180, 182 minimum pulse widths (FIGS. 8a–8c). Logic signals 144 and 152 directly result in charge PUMP UP 180 and charge PUMP DOWN 182 signals. The first signal (the positive phase comparator output signal 144 or the positive pulse gate output signal 152) to arrive that is a logic high turns ON one of the pump circuits; the second signal to arrive that is a logic high turns ON the other pump circuit. The last signal to transition high produces a minimum width pump pulse.

When the positive pulse gate 124 and the positive phase comparator 132 receive the first reset signal 160 (logic high), the positive pulse gate output signal 152 transitions low as does the positive phase detector output signal 144. In addition, the first reset signal 160 also is input to the positive edge detector 108. When the positive edge detector 108 receives the logic high reset signal 160, the positive data signal 109 becomes a logic low signal. When the positive data transition 204 occurs very late in the data cell window 200, the clearing of the positive edge detector 108 may in fact occur during the data clock cycle when the negative edge detector 110 receives a negative data transition 102. The availability of time during the negative data transition cycle to clear the positive transition circuitry 104 makes it possible for the system 100 to handle closely spaced data transitions.

The negative data edge circuitry 106 is identical to the positive data edge circuitry 104, except that the negative edge detector 110 is sensitive to falling data transitions 206. The negative data edge circuitry 106 has a negative edge detector logic element (F4) 110 which is sensitive to falling edge data transitions 206 in the incoming data signal 102 it receives at its clock signal input port 118. The negative edge detector 110 may also be a D flip flop.

The negative data edge circuitry 106 has a second delay line 122 which is matched with the first delay lines 120 in respect to power level and layout orientation. (i.e. both delay lines 120, 122 delay the data signal it receives by about the same amount and both of the delay lines 120, 122 are controlled by the loop filter node 35 as much as the VCO 128 is.)

Like the positive edge detector 108, the negative edge detector 110 is a D flip-flop, in the preferred embodiment, with a Q4 output signal 114 and a Q4 output signal 111. Because the negative edge detector 110 is cleared prior to the arrival of the data signal 102, a logic high or a "1" at the Q4 output signal 114 is fed back into the negative edge detector's data input port D4. When a falling edge data transition 206 occurs in the data signal 102 (FIG. 10a), the negative edge detector 110 generates a negative detector output signal 111 (hereinafter referred to as "negative data signal") having the same logic level as the signal it receives at its data input port D4 (FIG. 10i).

The data signals Q1, Q4 input to the edge detectors 108, 110 cannot be driven from a constant force 1 level condition due to the possibility of illegal states upon power up. If a constant force 1 is used instead of feeding back Q1 and Q4, then it is possible on power up for signals 109, 111 to be high and signals 144, 146 to be low. Thus, the data signal 102 would be unable to produce a positive transition at delayed data signals 128, 130 allowing signals 144, 146 to transition high and clear the edge detectors 108, 110.

In the preferred embodiment, if the detectors 108, 110 power up with signals 109, 111 in a high state, then the data signal 102 causes the detectors 108, 110 to toggle to a low state due to the feedback of Q1 and Q4 to inputs D1, D4. Thus the detectors 108, 110 are initialized to a logic low state.

The negative data signal 111 is input to the second delay line 122 which delays the negative data signal 111 by the preselected amount thereby producing a delayed negative data signal 130 (FIG. 10j). In the preferred embodiment, the first and the second delay lines 120, 122 are each comprised of six non-inverting differential "ECL" logic gates 300 (FIG. 4).

A negative phase comparator system consists of a negative phase logic element 134, a negative pulse gate 126 and a logic gate G4. The negative phase comparator system also has two inputs: the delayed negative data signal 130 and the VCO transition signal 148.

The delayed negative data signal 130 is input to the clock signal input port of a negative phase logic element 134 (F6). In the preferred embodiment, the negative phase logic element 134 is also a D flip flop and a constant logic high signal 138 (or "1") (FIG. 10b) is input to its data input port D6. On the rising edge of the delayed negative data signal 130, the negative phase logic element 134 generates a negative phase output signal (Q6) 146 that is the same level (logic high) as the signal 138 input to its data input port D6 (FIG. 10l). If the delayed negative data signal 130 does not have a rising edge during a particular data cell, the negative phase logic element 134 remains a logic low signal 146. The negative phase output signal 146 is one of the output signals generated by the negative phase comparator system.

The negative data signal 111 is also input to the data input port D5 of a negative pulse gate 126 (F5), which in the preferred embodiment is a D flip-flop. The VCO transition signal 148 is also input to the negative pulse gate's 126 clock signal input port 150. Similar to the positive pulse gate 124, the negative pulse gate 126 records the occurrence of the VCO transition signal (FIG. 10e) when a falling transition 206 occurs in the data signal 102.

On the rising edge of the VCO transition signal 148, the negative pulse gate 126 generates a negative pulse gate output signal 154 (Q5) (FIG. 10k) which has a logic level that is the same as the logic level of the negative data signal 111 which is input to the negative pulse gate's data port D5. The negative pulse gate output signal is another one of the output signals generated by the negative phase comparator system. Hence, the negative pulse gate output signal 154 is a logic high signal when the negative data signal 111 is a logic high. The negative data signal, in turn, is a logic high when the data signal 102 has a falling transition 206.

As with the positive phase comparator system, the negative pulse gate 126 has dual functions. First, it records the occurrence of the VCO transition signal 148 to "gate" it in when a negative data transition is detected. The second function of logic element 126 is to control the commencement of the negative phase comparator system by initiating its operation by gating the VCO signal 154.

As previously discussed, the negative phase output signal 146 is input to the first OR gate 176. When the negative phase output signal 146 is a logic high (i.e., a falling data transition was received by the negative edge detector 110) the first OR gate 176 generates a logic high PUMP UP signal 180 (FIG. 10n).

Similarly, as previously discussed, the negative pulse gate output signal 154 is input to the second OR gate 178; if the negative pulse gate output signal 154 is a logic high signal (i.e., a falling data transition 206 occurred), a logic high PUMP DOWN signal 182 is generated (FIG. 10o).

The negative pulse gate signal 154 and the negative phase output signal 146 are input to a second reset circuitry 186 (G4), which, in the preferred embodiment, is a second logical NOR gate (G4). The second NOR gate 186 generates a second reset signal 162 which is used to clear the negative pulse gate 126 and the negative phase logic element 134, when they have both generated logic high output signals 146, 154, thereby terminating the operation of the negative phase comparator system. The NOR gate 186 is preceded with inverting gates 187 (forming the equivalent of an AND gate function) to intentionally introduce an additional gate delay and gate architecture. The inverting gates 187 set the minimum charge pump pulse width and minimize the propagation delay differences of the second reset circuitry 186 when activated from the negative pulse gate output signal 154 versus the negative phase output signal 146.

The PUMP DOWN signal 182 is a negative current signal and the PUMP UP signal 180 is a positive current signal which charge down/up a capacitor in the phase lock loop's low pass filter 18 to increase/decrease the VCO's 128 voltage and thus to increase/decrease the VCO's frequency. Hence, the PUMP UP 180 signal charges up the VCO's capacitor and the PUMP DOWN signal 182 discharges the capacitor to adjust the frequency of the VCO 128 to track the phase of the data signal 102.

Referring again to FIG. 1 and FIGS. 8a–8c if the data signal's 102 rising transition 204 is centered within the clock window and the phase locked loop 14 is stable (i.e., the VCO transition signal 148 and the delayed data signal 128, 130 are in phase) then the positive comparator output signal 144, is input to the first OR gate 176 at approximately the same time that the positive pulse gate output signal 152 is input to the second OR gate 178. The first OR gate 176 generates a PUMP UP signal 180 at about the same time that the second OR gate 178 generate a PUMP DOWN signal 182, thereby effectively cancelling one another out.

Similarly, if the data signal's 102 falling transition 206 is centered, then the negative pulse gate output signal 154 is input to the first OR gates 178 at about the same time that the negative phase output signal 146 is input to the second OR gate 176. Again, in this situation, the PUMP UP signal 180 and the PUMP DOWN signal 182 issue approximately simultaneously.

Referring in particular to FIGS. 8a–8c, timing diagrams for the PUMP UP 180 and the PUMP DOWN 182 signals are illustrated. The amount of net loop correction which results from the occurrence of the VCO transition signal 127 and the positive and negative data transitions 204, 206 activating the PUMP DOWN 182 and PUMP UP 18C signals depends upon the relative timing between them. FIG. 8a illustrate the situation when the delayed data transition signals 128, 130 and the VCO transition 148, are in phase and arrive at the phase logic elements 132, 134, 124 & 126 simultaneously. Both the PUMP UP 180 and PUMP DOWN signals 182 issue approximately simultaneously producing PUMP UP 180 and PUMP DOWN 182 pulses of minimum but equal widths (i.e., the signals 180, 182 last for approximately the same duration). The charge pump circuitry 31 converts the PUMP UP and PUMP DOWN pulses 180, 182 into complementary polarity currents which are summed at the filter 18 thereby resulting in a zero net correction. Hence, the net effect of the PUMP UP signal 180 and the PUMP DOWN signal 182 on the low pass filter 18 is about 0.

FIGS. 8b and 8c illustrate the situation when either the VCO transition signal 127 or the data transitions 204, 206 occurs earlier than the other resulting in the earliest initiated pump pulse being on longer and producing a net non-zero delta correction to the filter 18. Referring to FIG. 8b, if the delayed data signal 128, 130 arrives at the phase logic elements 132, 134, before the VCO transition signal 148, then the PUMP UP signal 180 is issued before the PUMP DOWN signal 182 is issued, and the capacitor in the low pass filter 18 is charged up during the time when the PUMP DOWN signal 182 is off and the PUMP UP signal 180 is on to speed up the VCO 128. Again, during the time when both signals 180, 182 are ON the net effect is 0.

Referring to FIG. 8c, if the VCO transition signal 148 arrives at the phase logic elements 124, 126 before the delayed data signal 128, 130 then the PUMP DOWN signal 182 is ON before the PUMP UP signal 180 is turned on. During the time period when only the PUMP DOWN signal 182 is ON, the capacitor in the low pass filter 18 discharges to slow down the VCO 128.

The edge transition insensitive delay line clock recovery system 300 separately accommodates for the phase locking of both positive 204 and negative 206 data transitions by having separate circuitry 104, 106 which separates negative transitions 206 from positive transitions 204 and transforms the negative data transitions 206 into positive transitions, thus eliminating delay line propagation delay dissymetries due to unmatched propagation times. The delay line propagation dissymetry is eliminated by the system 300 because negative data transitions 206 are converted to positive transitions so only positive data transitions propagate through the negative edge circuitry delay line 122.

In addition, the system 300 also addresses the problem of passing narrow pulses through the delay lines 120, 122 due to the late and then early arrival of data transitions 204, 206 in adjacent data cells 200. By having separate data circuitry 104, 106 (and therefore separate data paths) for rising 204 and falling 206 data transitions, the delay lines 120, 122 are presented with a single latched positive data transition 109, 111 which remains constant until it is cleared.

Having thus described the invention, it is recognized that those skilled in the art may make various modifications or additions to the preferred embodiment chosen to illustrate the invention without departing from the spirit and scope of the present contribution to the art. Accordingly, it is to be understood that the prosecution sought and to be afforded hereby should be deemed to extend to the subject matter claimed and all equivalents thereof within the scope of the invention.

We claim:

1. A system for recovering a clock signal from a data signal having rising and falling data transitions, comprising:

detection means for detecting data transitions in the data signal;

transition means for generating a transition signal indicative of a detected data transition, wherein the transition signal has a logic level associated therewith and wherein the logic level is a first level when a transition is detected;

delay means for delaying the transition signal by a preselected time period;

means responsive to a correction signal for generating a clock signal having clock transitions which occur in synchronization with the data transitions;

comparison means for comparing the delayed transition signal to a reference signal and for generating the correction signal indicative of a phase difference therebetween; and gating means responsive to the first logic level of the transition signal for supplying the clock signal to the comparison means such that the clock signal is the reference signal.

2. The system of claim 1, wherein the detecting means, comprises:

means responsive to a rising data transition in the data signal; and means responsive to a falling data transition in the data signal.

3. The system of claim 1, wherein the transition means generates a rising transition signal having the first logic level when a rising data transition is detected and generates a falling transition signal having the first logic level when a falling data transition is detected.

4. The system of claim 1, where the first logic level is a logic high.

5. The system of claim 3, wherein the transition signal comprises the rising transition signal and the falling transition signal.

6. The system of claim 3, wherein the gating means includes:

rising gating means responsive to the rising transition signal for supplying the clock signal; and falling gating means responsive to the falling transition signal for supplying the clock signal, wherein the rising gating means supplies the clock signal as the reference signal and the falling gating means supplies the clock signal as the reference signal.

7. The system of claim 6, wherein the rising gating means includes a pulse gate and the falling gating means includes a pulse gate.

8. The system of claim 7, wherein the pulse gate is a D-type flip flop.

9. The system of claim 3, wherein the delay means further comprises:

rising delay means for delaying the rising transition signal by the preselected time period; and falling delay means for delaying the falling transition signal by the preselected time period.

10. The system of claim 1, wherein the clock transitions occur in synchronization with the transitions in the data signal when the correction signal is about zero.

11. The system of claim 1, wherein the preselected time period is about equal to one half a data cell window, where the data cell window is the time interval during which the transition occurs in the data signal.

12. The system of claim 1, wherein the means for generating the clock signal has a clock cycle associated therewith and wherein the preselected time period is proportional to the clock cycle.

13. The system of claim 1, wherein the means for generating the clock signal, comprises:

a phase comparator which compares the delayed transition signal and the reference signal and generates the correction signal; and a voltage controlled oscillator responsive to the correction signal to generate the clock signal wherein the clock transitions and the data transitions occur in synchronization when the correction signal is about zero.

14. The system of claim 3, wherein the comparison means includes:
rising comparison means for comparing the rising transition signal with the clock signal and for generating a rising comparison signal; and
falling comparison means for comparing the falling transition signal with the clock signal and for generating a falling comparison signal, wherein the comparison signal includes the rising and the falling comparison signals.

15. A system for regenerating a clock signal from a data signal having rising and falling data transitions, comprising:
rising detecting means for detecting a rising data transition in the data signal;
negative detecting means for detecting a falling data transition in the data signal;
rising transition means for generating a rising transition signal indicative of the detected rising transition, wherein the rising transition signal has a logic level associated therewith wherein the logic level is a preselected level when a rising transition is detected;
falling transition means for generating a falling transition signal indicative of the detected falling data transition in the data signal, wherein the falling transition signal has a logic level associated therewith wherein the logic level is the preselected level when a falling transition is detected;
delay means for delaying the data signal by a preselected time period;
means responsive to a correction signal for generating a clock signal having clock transitions which occur in synchronization with the data transitions;
comparison means for comparing the delayed data signal to a reference signal and for generating the correction signal indicative of a phase difference therebetween; and
gating means responsive to the rising transition signal and the falling transition signal for supplying the clock signal to the comparison means when a transition is detected such that the clock signal is the reference signal.

16. The system of claim 15, wherein the delay means includes:
first delay means for delaying the rising transition signal; and
second delay means for delaying the falling transition signal.

17. A method for recovering a clock signal from a data signal having rising and falling data transitions, comprising:
detecting a data transitions in the data signal;
generating a transition signal indicative of a detected transition, wherein the transition signal has a logic level associated therewith and wherein the logic level is a first preselected level when a transition is detected;
delaying the transition signal by a preselected time period;
generating a clock signal having clock transitions which occur in synchronization with the data transitions in response to a correction signal;
comparing in a means for comparing the delayed transition signal to a reference signal and generating the correction signal indicative of a phase difference therebetween; and
supplying the clock signal to the means for comparing in response to the first logic level of the transition signal such that the clock signal is the reference signal.

18. The method of claim 17, wherein the step of generating the transition signal further includes the steps of:
generating a rising transition signal when a rising data transition is detected in the data signal;
generating a falling transition signal when a falling data transition is detected in the data signal, wherein the transition signal includes the rising transition signal and the falling transition signal.

19. The method claim 18, wherein the step of supplying further includes the steps of:
supplying the clock signal as the reference signal in response to the rising transition signal; and
supplying the clock signal as the reference signal in response to the falling transition signal.

20. The method of claim 18, wherein the step of delaying further comprises the steps of:
delaying the rising transition signal by the preselected time period and delaying the falling transition signal by the preselected time period.

21. The method of claim 18, wherein the step of comparing, further includes the steps of:
comparing the rising transition signal with the clock signal and generating a rising comparison signal; and
comparing the falling transition signal with the clock signal and generating a falling comparison signal wherein the comparison signal includes the rising and the falling comparison signals.

22. A system for recovering a clock signal from a data signal having logic state transitions, the system comprising:
detection means for detecting logic state transitions in the data signal;
transition means for generating a transition signal indicative of a detected logic state transition;
delay means for delaying the transition signal by a preselected time period;
means responsive to a correction signal for generating a clock signal having clock transitions which occur in synchronization with the logic state transitions;
comparison means for comparing the delayed transition signal to a reference signal and for generating the correction signal indicative of a phase difference between the reference signal and the delayed transition signal; and
gating means responsive to the transition signal for supplying the clock signal to the comparison means such that the clock signal is the reference signal.

23. The system of claim 22, wherein the logic state transitions include first logic state transitions from a high logic state to a low logic state and second logic state transitions from a low logic state to a high logic state and wherein:
the transition means comprises means for detecting first logic state transitions and means for detecting second logic state transitions; and
the delay means includes
first delay means for delaying the data signal when a first logic state transition is detected; and
second delay means for delaying the data signal when a second logic state transition is detected.

24. A system for regenerating a clock signal from a data signal having logic state transitions, the system comprising:
- first detection means for detecting a first logic state transition in the data signal;
- second detection means for detecting a second logic state transition in the data signal;
- first transition means for generating a first transition signal when a first logic state transition is detected;
- second transition means for generating a second logic state transition signal when a second logic state transition is detected;
- first delay means for delaying the first transition signal by a preselected time period;
- second delay means for delaying the second transition signal by the preselected time period;
- first comparison means for comparing the delayed first transition signal to a reference signal and for generating a first correction signal indicative of a phase difference between the delayed first transition signal and the reference signal;
- second comparison means for comparing the delayed second transition signal to the reference signal and for generating a second correction signal indicative of a phase difference between the delayed second transition signal and the reference signal;
- means responsive to the first correction signal and the second correction signal for generating a clock signal having clock transitions which occur in synchronization with the detected first and second logic state transition;
- first gating means for supplying the clock signal to the first comparison means when a first logic transition is detected; and
- second gating means for supplying the clock signal to the second comparison means when a second logic transition is detected.